United States Patent [19]
Nakamura et al.

[11] Patent Number: 5,920,554
[45] Date of Patent: Jul. 6, 1999

[54] MOBILE STATION APPARATUS USED IN CDMA CELLULAR RADIO SYSTEM AND SPREAD CODE SYNCHRONIZATION METHOD THEREFOR

[75] Inventors: Ken Nakamura, Yokohama; Arata Obayashi, Tokyo, both of Japan

[73] Assignee: Kabushiki Kaisha Toshiba, Kawasaki, Japan

[21] Appl. No.: 08/715,230

[22] Filed: Sep. 18, 1996

[30] Foreign Application Priority Data

Sep. 18, 1995 [JP] Japan .................................. 7-238325

[51] Int. Cl.⁶ .................................................. H04B 7/216
[52] U.S. Cl. .......................... 370/335; 370/342; 375/200; 455/67.1; 455/524; 455/550
[58] Field of Search ..................................... 370/328, 331, 370/332, 335, 342, 441; 375/200; 455/425, 422, 517, 524, 550, 65, 67.1

[56] References Cited

U.S. PATENT DOCUMENTS

| | | | |
|---|---|---|---|
| 5,577,022 | 11/1996 | Padovani et al. | 370/335 |
| 5,644,591 | 7/1997 | Sutton | 375/200 |
| 5,680,395 | 10/1997 | Weaver, Jr. et al. | 370/335 |

*Primary Examiner*—Chi H. Pham
*Assistant Examiner*—Ricky Ngo
*Attorney, Agent, or Firm*—Banner & Witcoff, Ltd.

[57] ABSTRACT

In a mobile station apparatus of this invention, when a first offset is captured by a search operation performed by a first PN code search mode, it is checked, on the basis of the SID broadcasted from the corresponding base station through a sync channel, whether a base station of a desired carrier is captured. If a base station of an undesired carrier is captured, a second PN code search mode receives a neighbor list message broadcasted from the base station of the undesired carrier through a paging channel, and causes a search receiver to perform a search operation, excluding spreading code offsets notified by the message.

23 Claims, 5 Drawing Sheets

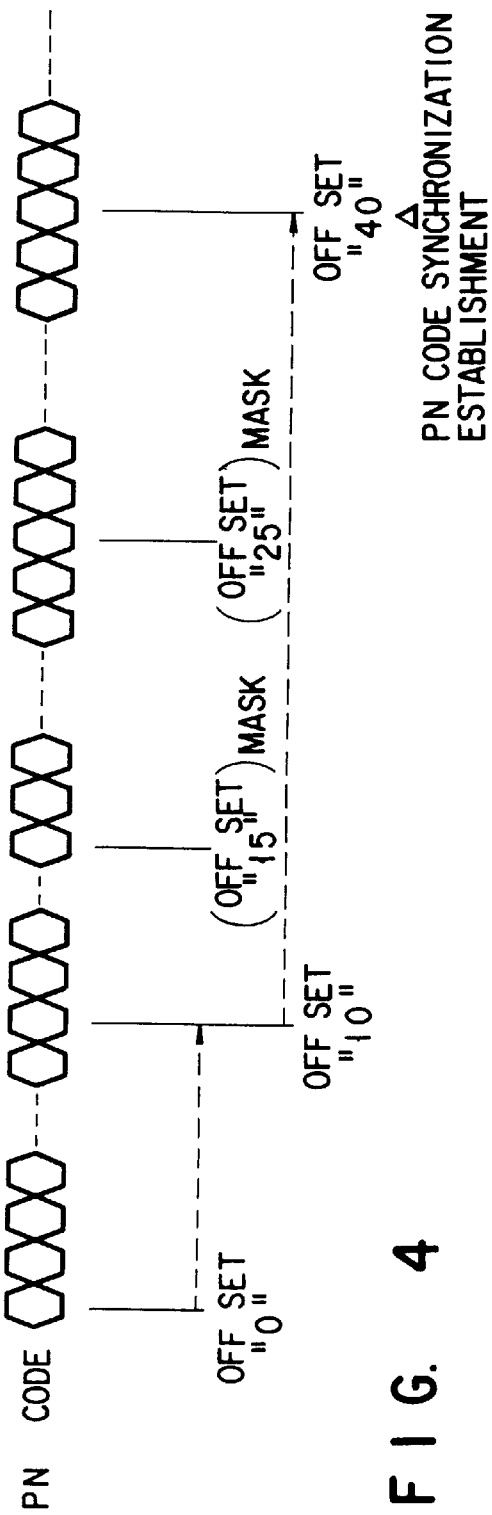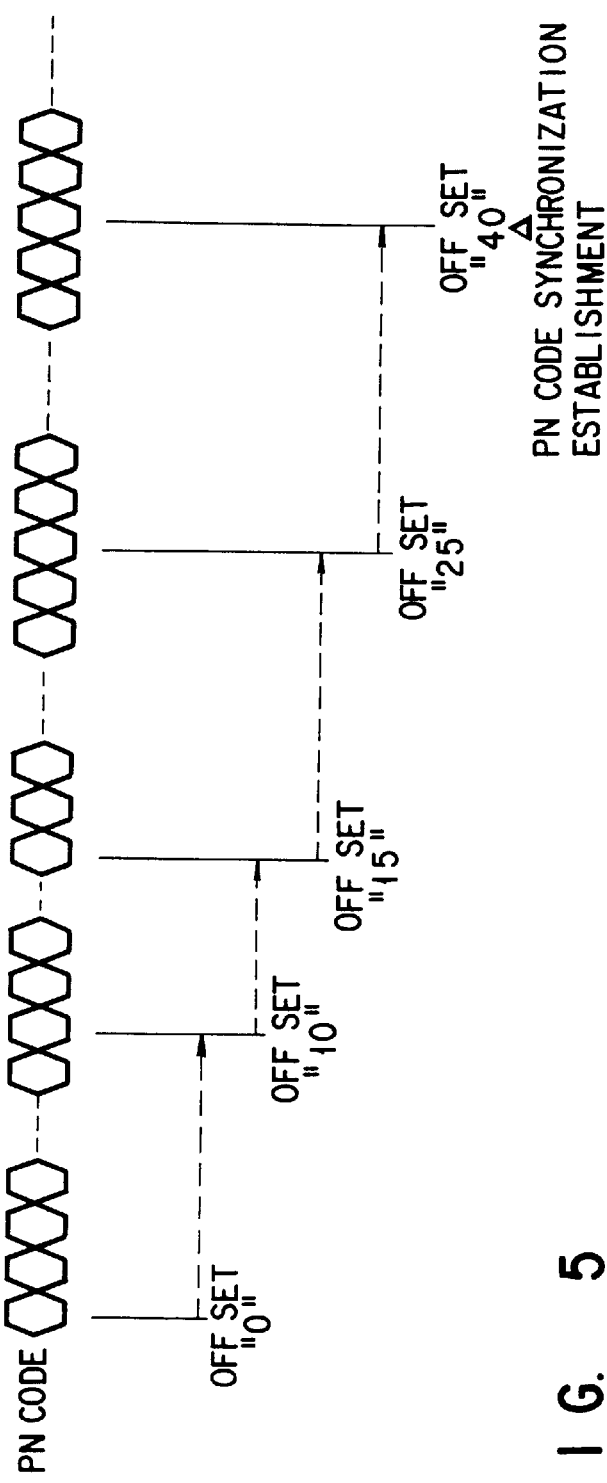

MOBILE STATION APPARATUS USED IN CDMA CELLULAR RADIO SYSTEM AND SPREAD CODE SYNCHRONIZATION METHOD THEREFOR

BACKGROUND OF THE INVENTION

1. Field of the Invention

The present invention relates to a mobile station apparatus used in a digital cellular radio system such as a mobile telephone system or cordless telephone system and, more particularly, to a mobile station apparatus using the code division multiple access (CDMA) scheme as a radio channel access scheme between the apparatus and a base station and a spreading code synchronization method used for the apparatus.

2. Description of the Related Art

As a communication scheme applied to a mobile communication system, a spread spectrum communication scheme which is resistant to interference and disturbance has recently received attention. The spread spectrum communication scheme is mainly used to realize a cellular radio system using the CDMA scheme.

According to a cellular radio system using the CDMA scheme, for example, in the apparatus on the transmission side, digital speech data or image data is modulated by a digital modulation scheme such as the PSK modulation scheme, and the modulated transmission data is converted into a wide-band baseband signal by using a spreading code such as a pseudorandom noise code (PN code). Thereafter, this signal is up-converted into a signal in a radio spectrum to be transmitted. In the apparatus on the reception side, the received signal in the radio spectrum is down-converted into a signal having an intermediate frequency or baseband frequency, and the signal is de-spread by using a spreading code identical to the spreading code used in the apparatus on the transmission side. Thereafter, digital demodulation of the signal is performed by a digital demodulation scheme such as the PSK demodulation scheme to reproduce the received data.

That is, in the CDMA scheme, different spreading codes are assigned to radio communications between a plurality of mobile station apparatuses and base stations to ensure channel separation between the respective radio communications.

In a system of this type, when a mobile station apparatus starts communication, synchronization must be established with respect to the spreading code of a radio signal transmitted from a base station. As a synchronization scheme for this purpose, the following scheme has been proposed.

For example, a PN code has a length of 215 chips, and a plurality of base stations generate PN codes from different preset chip phases. A chip phase from which generation of a PN code is started is called an offset.

When the power supply of a given mobile station apparatus is turned on, a PN code generator generates PN codes while gradually shifting the chip phase from zero offset. The apparatus monitors the correlation values between these PN codes and the PN codes of indicating signals broadcasted from base stations so as to search the offsets of the PN codes used in the base stations. Each time an offset of a PN code used in a base station is captured by this search, the apparatus receives a sync channel to check system identification information (SID) for identifying the mobile communication network. If this SID corresponds to a desired network, the apparatus shifts to a standby state. If a communication request is generated in this standby state, the apparatus captures a signal, of radio signals transmitted from a plurality of base stations in the desired network, which has the highest reception level. Thereafter, the apparatus shifts to a communication state while maintaining the PN code synchronization between the apparatus and the base station as a transmission source for this radio signal.

If the SID does not correspond to a desired network, the apparatus generates PN codes while shifting the chip phase from the last captured offset. With this operation, the apparatus searches the offsets of the PN codes of indicating signals broadcasted from other base stations. Each time an offset of a PN code is captured, a sync channel is received to check an SID. If this SID corresponds to a desired network, the apparatus shifts to the standby state. If the SID does not correspond to a desired network, the apparatus searches the offsets of PN codes again.

Subsequently, a search the offsets of PN codes and determination of SIDs are repeated until the SID of the desired network is received.

The following problems to be solved are posed in the conventional proposed PN code synchronization scheme. In the metropolitan areas, a plurality of communication companies (carriers) may install base stations in a common service area to constitute cells, thereby constructing a cellular radio system. In this case, if mobile communication networks of a plurality of carriers respectively use different radio frequencies, no problem is posed. In some case, however, such networks share radio frequencies for the sake of the effective use of the radio frequencies. In this case, the radio channels used between the carriers must be discriminated from each other by using other means. According to a conventional discrimination scheme, for example, different offsets are set for PN codes assigned to base stations in the mobile communication networks of the respective carriers.

In such a system, however, when PN code synchronization is to be established by using the above conventional PN code synchronization scheme, a given mobile station apparatus may continuously capture only offsets assigned to the networks of undesired carriers depending on the assignment of the offsets to the networks of the respective carriers. As a result, it may take a long period of time to capture a base station of a desired carrier.

Assume that carriers X and Y have base stations BSx1 to BSx3 and BSy1 to BSy3 installed in the respective common service areas to form cells Ex1 to Ex3 and Ey1 to Ey3, offsets "10", "15", and "25" are respectively assigned to the base stations BSx1 to BSx3, and offsets "40", "45", and "50" are respectively assigned to the base stations BSy1 to BSy3, as shown in FIG. 6.

When a mobile station apparatus PS at a position where it can receive indicating signals from all the base stations BSx1 to BSx3 and BSy1 to BSy3 is to establish PN code synchronization with respect to one of the base stations BSy1 to BSy3 of the desired carrier Y, the following synchronization establishing operation is performed. The mobile station apparatus PS starts to search a PN code from the offset "0", and sequentially captures the offsets "10", "15", and "25" of the base stations BSx1 to BSx3 of the undesired carrier X. At the fourth search, the mobile station apparatus PS captures the offset "40" of the base station BSy1 of the desired carrier Y.

Before capturing the offset "40" of the base station BSy1 of the desired carrier Y, the mobile station apparatus PS must capture all the offsets "10", "15", and "25" of the base stations BSx1 to BSx3 of the undesired carrier X. In addition, the mobile station apparatus PS must receive an SID through a sync channel and perform determination processing every time an offset is captured. For this reason, it takes a long period of time to capture a base station of the desired carrier Y.

SUMMARY OF THE INVENTION

It is an object of the present invention to provide a mobile station apparatus which is used in a CDMA cellular radio system and can shorten the time required to capture a base station of a desired mobile communication network so as to perform high-speed synchronization establishment, and a spreading code synchronization method for the apparatus.

In order to achieve the above object, according to the first aspect of the present invention, there is provided a mobile station apparatus used in a CDMA cellular radio system in which a plurality of mobile communication networks have a plurality of base stations distributed in a common service area, and radio communication based on a CDMA scheme is performed between the base stations and the mobile station apparatus using different spreading code offsets respectively assigned to the base stations, comprising a list information acquisition section for acquiring, from one of the base stations, list information indicating a first spreading code offset assigned to a base station other than the base station which transmits the list information, and a spreading code search section. The spreading code search section searches a second spreading code offset other than the first code offset on the basis of the acquired list information.

According to the first aspect of the present invention, since a spreading code search operation is performed by using list information indicating the first spreading code offset and acquired from one of the base stations, the spreading code offsets assigned to the undesired base stations are not captured. This operation can shorten the time required to capture the spreading code offset assigned to the desired base station.

In order to achieve the above object, according to the second aspect of the present invention, a first spreading code search section performs a first spreading code search operation with respect to all spreading code offsets and captures a first spreading code offset assigned to the first base station. If the first spreading code offset of the desired base station is captured by this search operation, the search operation is terminated. If, however, the first spreading code offset assigned to the undesired base stations is captured, list information indicating a second spreading code offsets and acquired from a second base station is received. Subsequently, a second spreading code search section performs a second spreading code search operation with respect to third spreading code offsets other than the first and second spreading code offset, on the basis of the received list information.

According to the second aspect of the present invention, list information indicating spreading code offsets can be acquired while the first spreading code search section performs a search operation to capture a spreading code offset assigned to a desired base station.

According to the second aspect of the present invention, the apparatus further includes a list information storage section for storing the received first and second spreading code offsets. With this arrangement, before the first spreading code search section starts to perform a third spreading code search operation, it is checked whether the first and second spreading code offsets are stored in the list information storage section. If it is determined that no first and second spreading code offsets are stored, the first spreading code search section is caused to perform a first spreading code search operation. If it is determined that the first and second spreading code offsets are stored, the second spreading code search section is caused to perform a second spreading code search operation, skipping the first spreading code search operation performed by the first spreading code search section.

With this arrangement, when, for example, a spreading code search operation is to be performed upon a power-on operation, a spreading code search operation, excluding the spreading code offsets assigned to an undesired mobile communication network from objects to be captured can be performed by using list information obtained in a spreading code search operation after a previous power-on operation. Therefore, no spreading code offsets assigned to the undesired base stations are captured, and the spreading code offset assigned to the desired base station can be captured at a higher speed.

In addition, the apparatus preferably includes an input section for allowing a user of the apparatus to designate at least one of a mobile communication network to which the desired base station belongs and a mobile communication network to be accessible. With this arrangement, the user can change the desired mobile communication network.

The apparatus preferably includes a network information display section for displaying information indicating a mobile communication network designated through the input section. With this arrangement, the user can check a designated mobile communication network.

In addition, designation of a mobile communication network through the input section is preferably monitored for a predetermined period of time before the first spreading code search section starts to perform a first spreading code search operation, and a subsequent spreading code search operation is preferably performed on the basis of the information of the designated mobile communication network. With this operation, a spreading code search operation can always be performed on the basis of the latest designation information of a mobile communication network, thereby decreasing the number of times a spreading code search operation is repeated.

Furthermore, designation of a mobile communication network through the input means is preferably continuously monitored after the spreading code offset assigned to the desired base station is captured. When the above designation is performed, at least one of the first and second spreading code search means is preferably caused to perform a spreading code search operation. With this operation, even when designation is performed to change the mobile communication network desired by the user in a standby state after spreading code synchronization, a new spreading code offset can be re-captured in accordance with the above designation/input without performing a power-on reset operation.

Information indicating that a spreading code search operation is in progress is preferably displayed while the first or second spreading code search means performs a spreading code search operation. With this operation, when the user sees the display section immediately after the power supply is turned on, he/she can recognize that a search operation is in progress.

After the spreading code offset assigned to the desired base station is captured, information indicating that a spreading code search operation is terminated may be displayed. With this operation, the user can clearly recognize that a spreading code search operation is terminated, and the mobile station apparatus can be used.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is a timing chart for explaining a PN code search operation performed by the mobile station apparatus in FIG. 1;

FIG. 5 is a timing chart for explaining a PN code search operation performed by a conventional mobile station apparatus.

DETAILED DESCRIPTION OF THE PREFERRED EMBODIMENTS

Figure 1:
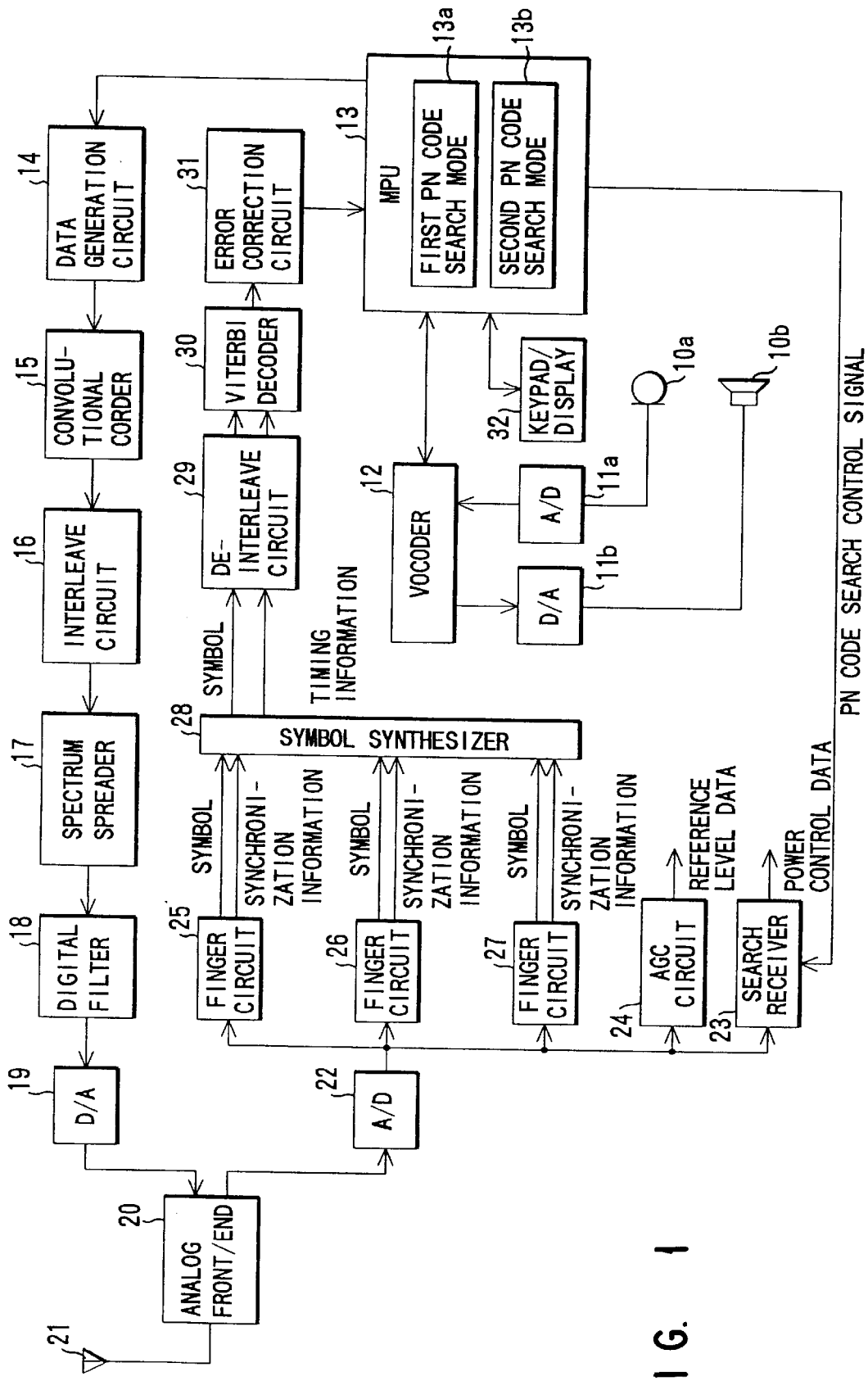
FIG. 1 is a block diagram showing the arrangement of a mobile station apparatus used in a CDMA cellular radio system according to an embodiment of the present invention.

FIG. 1 is a block diagram showing the arrangement of a mobile station apparatus used in a CDMA cellular radio system according to an embodiment of the present invention.

A transmission speech signal (based on utterances from a user) output from a microphone 10a is converted into a digital signal by an analog/digital converter (A/D) 11a. The digital signal is then coded by a speech coder/decoder (to be referred to as a vocoder hereinafter) 12. A microprocessor (MPU) 13 adds a control signal and the like to the coded transmission signal output from the vocoder 12 to generate transmission data.

A data generation circuit 14 adds an error detection code and an error correction code to this transmission data. The resultant data is coded by a convolutional coder 15. An interleave circuit 16 performs interleave processing for the coded data. The transmission data output from the convolutional coder 15 is spectrum-spread into a wide-band signal by a spectrum spreader 17 using a PN code. A digital filter 18 removes unnecessary frequency components from this spectrum-spread transmission signal. The resultant signal is converted into an analog signal by a digital/analog converter (D/A) 19. This analog transmission signal is up-converted into a signal having a predetermined radio channel frequency and power-amplified to a predetermined transmission power level by an analog front end 20. Thereafter, the signal is transmitted from an antenna 21 to a base station (not shown).

On the other hand, a radio signal received by the antenna 21 is low-noise-amplified and down-converted into a signal having an intermediate frequency or baseband frequency by the analog front end 20. The received signal output from the analog front end 20 is converted into a digital signal at a predetermined sampling period by an A/D converter 22. The digital signal is then input to a search receiver 23, an automatic gain control (AGC) circuit 24, and three finger circuits 25, 26, and 27.

Each of the finger circuits 25, 26, and 27 includes an initial capturing section, a clock tracking section, and a data demodulation section. The data demodulation section de-spreads the spectrum of the received transmission signal from a base station, and integrates the resultant signal through an integrating dump filter for a one-symbol period. Note that the three finger circuits are used to receive a signal at a high S/N ratio by using the path diversity effect, and to switch base stations on the other end during communication without disconnecting the radio channel, i.e., to perform a so-called soft handoff operation.

The respective symbols demodulated by the finger circuits 25, 26, and 27 are input to a symbol synthesizer 28, together with synchronization information, to be synthesized. The synthesized demodulated symbol is input to a de-interleave circuit 29, together with timing information, to be subjected to de-interleave processing. The resultant demodulated symbol is Viterbi-decoded by a Viterbi decoder 30. The resultant demodulated symbol is subjected to error correction decoding processing in an error correction circuit 31 to become received data. The received data is input to the MPU 13. The MPU 13 separates the input received data into speech data and control data. The speech data is speech-decoded by the vocoder 12 and converted into an analog signal by a D/A converter 11b. The analog signal is then output as speech from a loudspeaker 10b.

A keypad/display 32 is used by the user to input dial data, control data, and the like, and serves to display various information associated with the operation state of the mobile station apparatus. The operation of the keypad display 32 is controlled by the microprocessor 13.

The search receiver 23 searches the PN codes of indicating signals broadcasted from base stations to capture the offsets of the base stations. The search receiver 23 basically has the same arrangement as that of each of the finger circuits 25, 26, and 27. Power control data obtained by the search operation of the PN codes is loaded into the microprocessor 13.

The microprocessor 13 has a PN code search control function in addition to various general control functions associated with the operation of the mobile station apparatus. The PN code search control function has a first PN code search mode 13a and a second PN code search mode 13b. The first PN code search mode 13a starts a search operation of PN codes from zero offset to sequentially capture all offsets, and receives an SID through a sync channel every time an offset is captured. The first PN code search mode 13a then determines on the basis of this SID whether an offset of a desired carrier is captured or an offset of an undesired carrier is captured. If an offset of a desired network is captured, the apparatus shifts to the standby state.

The second PN code search mode 13b operates when the first PN code search mode 13a determines that the offset of an undesired network is obtained. First of all, the second PN code search mode 13b receives a neighbor list message transmitted from the base station through a paging channel. A neighbor list message is a message sent from a given base station to notify the mobile station apparatus of offsets assigned to other base stations belonging to the same network that the given base station belongs to. The second PN code search mode 13b then causes the search receiver 23 to perform a PN code search operation, excluding the offsets notified from the base station through the neighbor list message.

Figure 2:
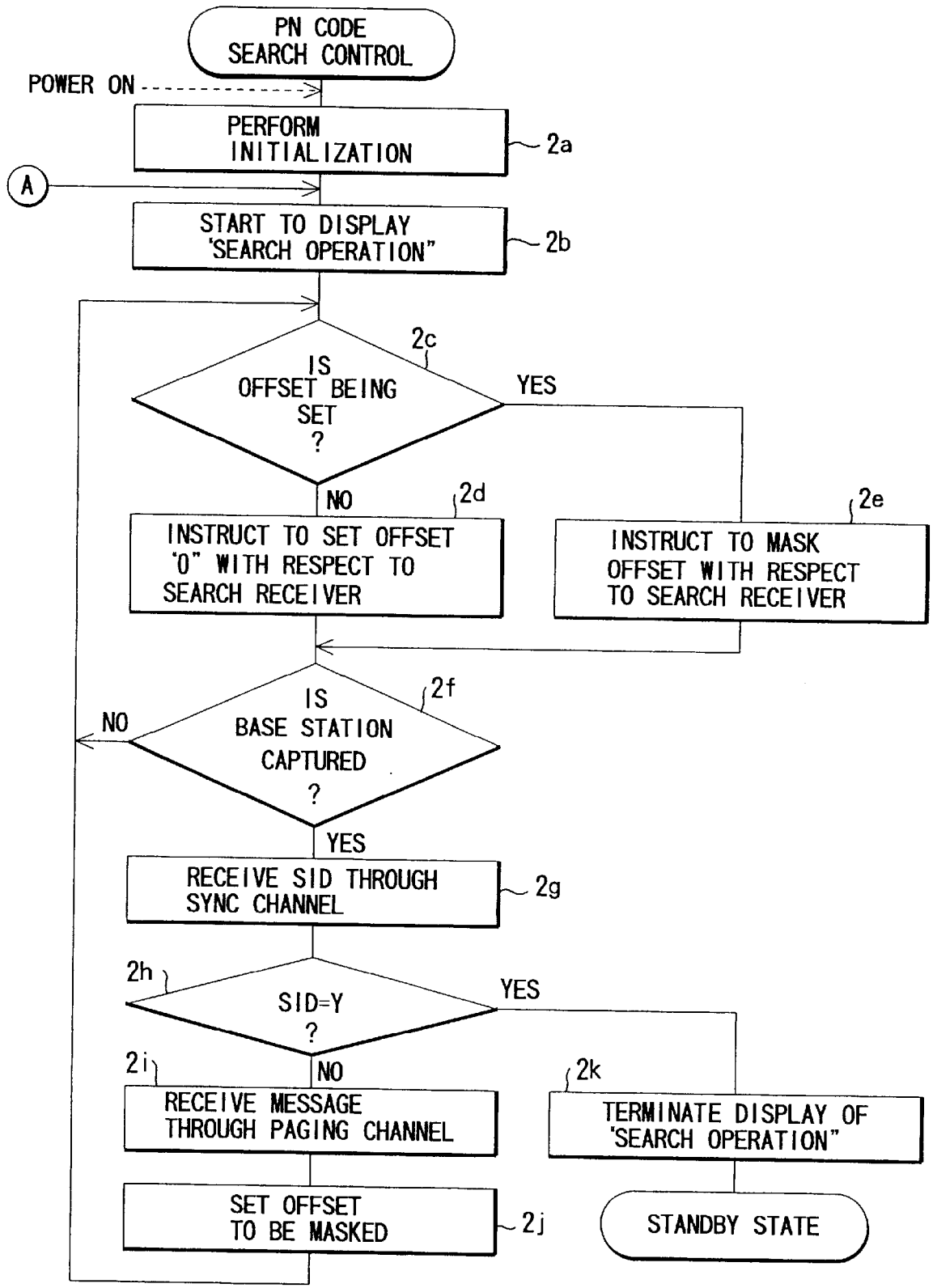
FIG. 2 is a flow chart showing the control procedure and control contents of PN code search control performed by the mobile station apparatus in FIG. 1.

A PN code search operation performed by the mobile station apparatus having the above arrangement will be described next in accordance with the control procedure of the microprocessor 13. FIG. 2 is a flow chart showing a control procedure and control contents of a PN code search operation performed by the microprocessor 13 and the search receiver 23.

Figure 6:
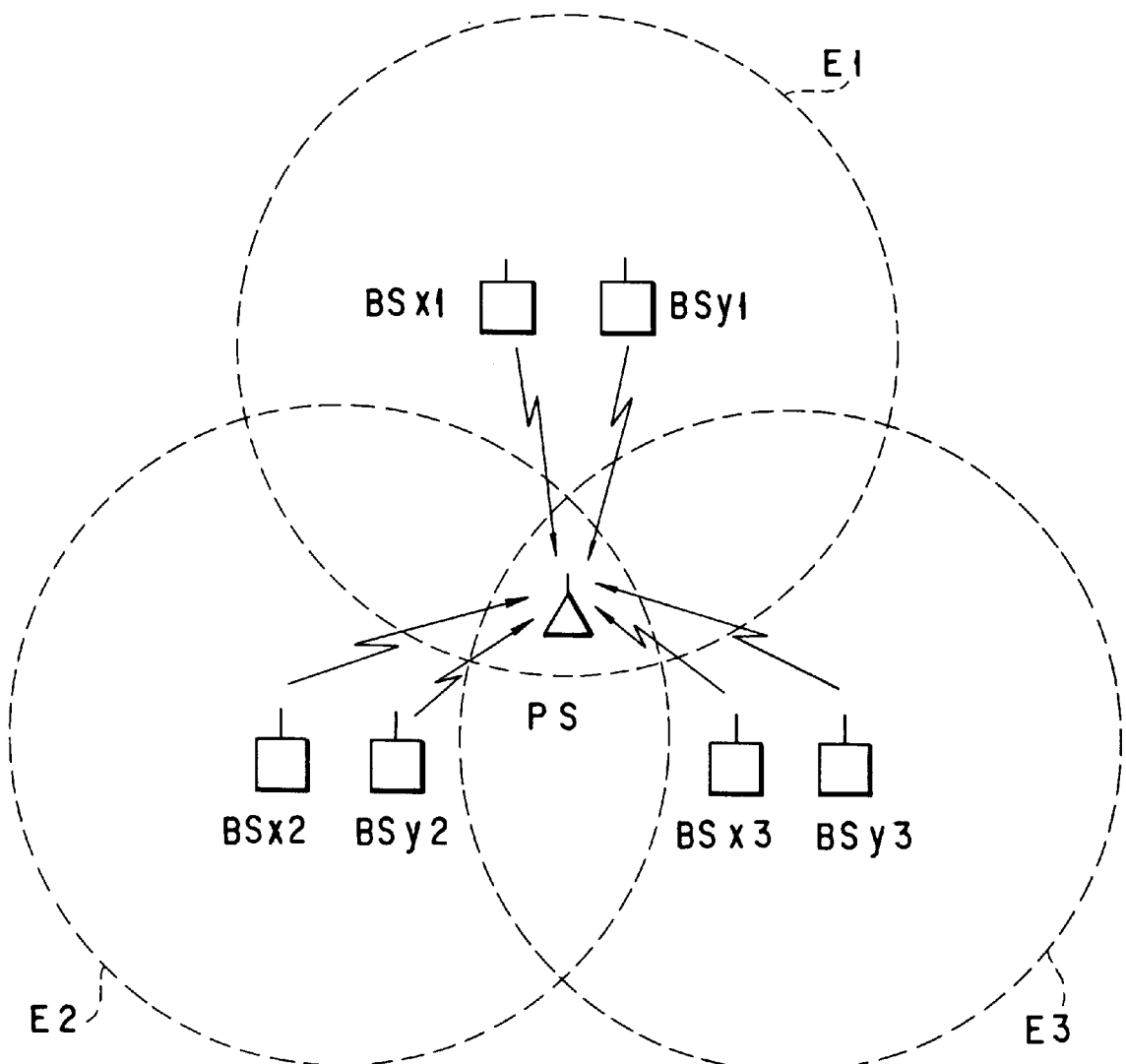
FIG. 6 is a view showing an arrangement in which a plurality of carriers install base stations in a common service area.

The following description will be made on the assumption that carriers X and Y respectively install base stations BSx1 to BSx3 and BSy1 to BSy3 in a common service area, offsets "10", "15", and "25" are respectively assigned to the base stations BSx1 to BSx3, and offsets "40", "45", and "50" are respectively assigned to the base stations BSy1 to BSy3, as shown in FIG. 6.

When the power supply of the mobile station apparatus PS is turned on, the mobile station apparatus PS initializes each circuit therein in step 2a. In step 2b, the mobile station apparatus PS causes the keypad display 32 to display a message or mark indicating that a search operation is being performed. In step 2c, it is checked whether there is any offset to be masked. If NO in step 2c, the flow advances to step 2d to cause the search receiver 23 to perform a search operation in the first PN code search mode. The search receiver 23 starts to search the offsets of PN codes from zero offset, as shown in FIG. 4.

If the first offset "10" is detected by this search operation, the flow of the microprocessor 13 advances from step 2f to step 2g to receive an SID through a sync channel. The microprocessor 13 then checks on the basis of this SID whether the base station corresponding to the captured offset "10" is a base station of the desired carrier Y (step 2h). If the microprocessor 13 determines that the captured offset "10" is not the one assigned to the desired carrier Y, the microprocessor 13 shifts to search control based on the second PN code search mode.

In step 2i, a neighbor list message broadcasted from the base station corresponding to the offset "10" through a paging channel is received/detected. In step 2j, the microprocessor 13 sets offsets to be masked in the subsequent PN code search operation, and notifies the search receiver 23 of the set contents, thereby causing the search receiver 23 to perform the subsequent search operation (step 2e). If the base station corresponding to offset "10" notifies the apparatus of the offsets "15" and "25" through the neighbor list message, the microprocessor 13 instructs the search receiver 23 to perform a PN code offset search operation, excluding these offsets "15" and "25" from objects to be searched. Subsequently, the search receiver 23 performs a PN code search operation, excluding the offsets "15" and "25" from objects to be searched, as shown in FIG. 4.

When the offset "40" of the next PN code is captured, the microprocessor 13 checks, on the basis of an SID notified from the base station corresponding to the offset "40" through the sync channel, whether a base station of the desired carrier Y is captured (step 2h). If it is determined that a base station of the desired carrier Y is captured, the flow advances to step 2k to cause the keypad display 32 to display a message or mark indicating that a searching operation is being performed. Thereafter, the flow advances to the standby state.

Figure 3:
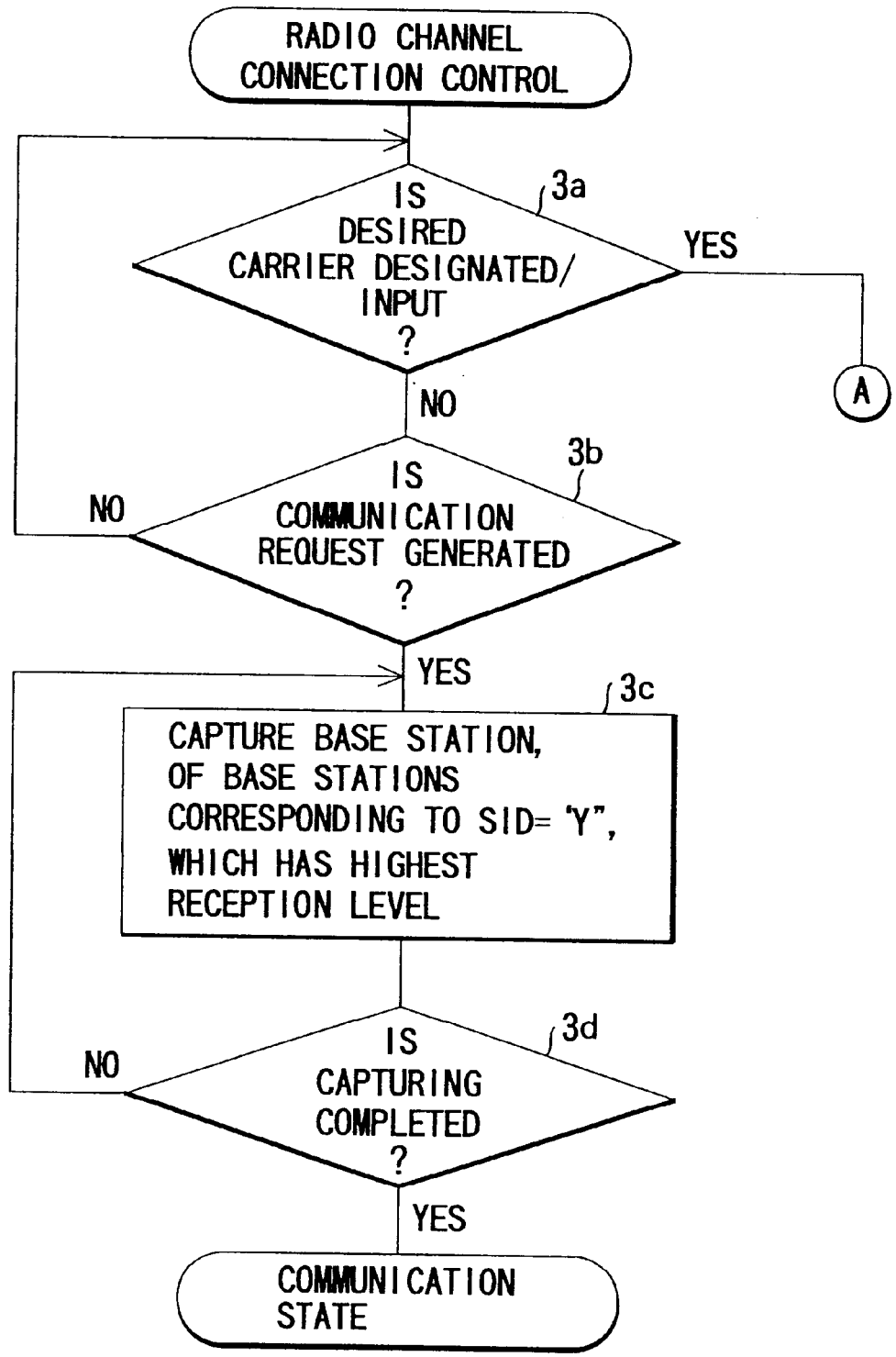
FIG. 3 is a flow chart showing the control procedure and control contents of radio channel connection control performed by the mobile station apparatus in FIG. 1.

In this standby state, the microprocessor 13 monitors the generation of a communication request in step 3b while monitoring an input operation performed by the user to designate a desired carrier in step 3a, as shown in FIG. 3. If, for example, the user performs an originating operation using the mobile station apparatus PS in this state, the flow of the microprocessor 13 advances to step 3c. In step 3c, a neighbor list message is detected from the base station BSy1, held in a PN code synchronization state, through a paging channel. A handoff operation is sequentially performed with respect to the offsets "45" and "50" of PN codes notified by this message. With this operation, the reception levels of indicating signals transmitted from the adjacent base stations BSy2 and BSy3 are detected. Of the base stations BSy1 to BSy3, the base station (e.g., BSy2) corresponding to the indicating signal having the highest reception level is selected. When the base station BSy2 is selected, the microprocessor 13 captures the offset of the PN code transmitted from the selected base station BSy2. If it is determined in step 3d that this capturing process is completed, the flow proceeds to communication with the captured base station BSy2.

If the user performs an input operation to designate a desired carrier in the standby state, the flow of the microprocessor 13 returns from step 3a to the PN code search control processing in FIG. 2, thereby executing control to search the offsets of base stations in the desired network designated by the input operation.

As described above, in this embodiment, when the first offset is captured in a search operation in the first PN code search mode, it is checked, on the basis of an SID broadcasted from the corresponding base station through the sync channel, whether a base station in the desired carrier Y is captured. If a base station in the undesired carrier X is captured, a neighbor list message broadcasted from the base station in the undesired carrier X is received by the second PN code search mode through the paging channel, and the search receiver 23 performs a search operation, excluding the offsets notified by the message.

In the search operation in the second PN code search mode, the search receiver 23 does not re-capture the base stations BSx1 to BSx3 of the undesired carrier X. As a result, the base stations BSy1 to BSy3 of the desired carrier Y can be captured within a short period of time. More specifically, as shown in FIG. 4, once the base station BSx1 (offset "10") of the undesired carrier X is captured, the remaining base stations BSx2 and BSx3 (offsets "15" and "20") of the undesired carrier X are not captured afterward, but the base station BSy1 corresponding to the offset "40" of the desired carrier Y is captured next. Therefore, the step of capturing the base stations BSx2 and BSx3 corresponding to the offsets "15" and "20" and the step of performing determination processing using SIDs after the capturing process are omitted, thereby shortening the time required to capture the base stations BSy1 to BSy3 of the desired carrier Y.

FIG. 5 shows an operation in a conventional PN code synchronization scheme of capturing the offset of the desired carrier Y using only the first PN code search mode. In this scheme, all the base stations BSx1 to BSx3 (offsets "10", "15", and "25") of the undesired carrier X are captured until the base station BSy1 (offset "40") of the desired carrier Y is captured. That is, an unnecessary search operation is repeated, and hence it takes a long period of time to establish PN code synchronization with respect to the base stations BSy1 to BSy3 of the desired carrier Y.

The present invention is not limited to the above embodiment. For example, in the embodiment, every time the power supply is turned on, a search operation in the first PN code search mode is performed first. If the first base station captured by this search operation is not a base station of a desired carrier, a search operation in the second PN code search mode is performed next.

However, a search operation in the first PN code search mode need not always be performed first when the power supply is turned on. A search operation in the second PN code search mode may be performed immediately after the power supply is turned on. More specifically, if a base station of an undesired carrier is captured in a PN code search operation when the power supply is turned on, a neighbor list message broadcasted from the captured base station is stored. Subsequently, when the power supply is turned on, it is checked whether a neighbor list message is stored in the previous power-on operation. If the message is stored, a search operation is started, excluding the offsets of the undesired network from objects to be searched, on the basis of the neighbor list message stored in the previous power-on operation. With this operation, there is no need to search any unnecessary offset values unless different offsets have been assigned to the respective base stations. As a result, a base station of a desired carrier can be captured within a short period of time.

In addition, when the power supply is turned on, an input operation performed by the user to designate a desired carrier may be monitored for a predetermined period before search control is started. In this case, if a desired carrier is designated within the predetermined period, a PN code search operation may be started in accordance with the designated carrier. If no input operation is performed within the predetermined period to designate a desired carrier, a PN code search is started using the carrier set in the past as a desired carrier. In the above operation, display information indicating a designated/input carrier or an already set carrier may be displayed on the keypad display 32.

In the above embodiment, while a search operation is performed, a message or mark indicating that the search operation is being performed is displayed. However, when a search operation is terminated, a message or mark indicating the end of the search operation may be displayed.

In addition, in the above embodiment, a PN code search operation is controlled by the microprocessor 13. However, the search receiver 23 may control this operation by itself. Alternatively, a search operation in the present invention may be performed by using the three finger circuits instead of the search receiver 23.

Furthermore, the control procedure and control contents of PN code search operations and the circuit arrangement and the like of the mobile station apparatus can be variously modified within the spirit and scope of the invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A mobile station apparatus for performing radio communication, based on a CDMA scheme, with one of a plurality of base stations distributed in a common service area by using different spreading code offsets respectively assigned to said base stations, comprising:

list information acquisition means for acquiring, from one of said plurality of base stations, list information indicating at least a first spreading code offset assigned to at least a base station other than the one of the plurality of base stations which transmits the list information; and spreading code search means for searching at least a second spreading code offset other than the first spreading code offset, on the basis of the acquired list information.

2. A spreading code synchronization method for a mobile station apparatus for performing radio communication, based on a CDMA scheme, with one of a plurality of base stations distributed in a common service area by using different spreading code offsets respectively assigned to said base stations, comprising the steps of:

acquiring, from one of said plurality of base stations, list information indicating at least a first spreading code offset assigned to at least a base station other than the one of the plurality of base stations which transmits the list information; and searching at least a second spreading code offset other than the first spread code offset, on the basis of the acquired list information.

3. A mobile station apparatus for performing radio communication, based on a CDMA scheme, with one of a plurality of base stations distributed in a common service area by using different spreading code offsets respectively assigned to said base stations, comprising:

first spreading code search means for performing a first spreading code search operation with respect to all the spreading code offsets and capturing a first spreading code offset assigned to a first base station;

first determination means for determining whether the captured first spreading code offset is predetermined;

list information reception means, when said first determination means determines that the captured spreading code offset is predetermined, for receiving list information indicating a second spreading code offset assigned to a second base station; and second spreading code search means for performing a second spreading code search operation with respect to third spreading code offsets other than the first and second spreading code offsets, on the basis of the received list information.

4. An apparatus according to claim 3, further comprising:

list information storage means for storing the first and second spreading code offsets.

5. An apparatus according to claim 4, further comprising:

means for causing only said second spreading code search means to perform a third spreading code search operation, on the basis of the list information stored in said list information storage means.

6. An apparatus according to claim 3, further comprising:

list information storage means for storing the first and second spreading code offsets;

second determination means for determining whether the first and second spreading code offsets are stored in said list information storage means;

search control means for causing said first spreading code search means to perform the first search operation when said second determination means determines that no spreading code offsets are stored, and causing said second spread search means to perform the second spreading code search operation, skipping the first spreading code search operation performed by said first spreading code search means, when said second determination means determines that the first and second spreading code offsets are stored.

7. An apparatus according to claim 3, further comprising input means for allowing a user of the apparatus to designate at least one of a mobile communication network to be inhibited and a mobile communication network to be accessible.

8. An apparatus according to claim 7, further comprising network information display means for displaying information indicating a mobile communication network designated through said input means.

9. An apparatus according to claim 7, further comprising first input monitor means for monitoring designation of the mobile communication network through said input means during a predetermined period of time before said first spreading code search means starts performing a spreading code search operation, and wherein said determination means determines, on the basis of information indicating the designated mobile communication network monitored by said first input monitor means, whether the captured first spreading code offset is identical with an offset assigned to one of base stations included in the designated mobile communication network.

10. An apparatus according to claim 3, further comprising search operation display means for displaying information indicating that one of the first and second spreading code search operations is being performed, while one of the first and second spreading code search operations is performed.

11. An apparatus according to claim 3, further comprising search end display means for displaying information indicating that one of the first and second spreading code search operations is completed, after a spreading code offset to be accessible is captured upon the first or second spreading code search operation performed by one of said first and second spreading code search means.

12. A spreading code synchronization method for a mobile station apparatus for performing radio communication, based on a CDMA scheme, with one of a plurality of base stations distributed in a common service area by using different spreading code offsets respectively assigned to said base stations, comprising the steps of:

performing a first spreading code search operation with respect to all spreading code offsets and capturing a first spreading code offset assigned to a first base stations;

determining whether the captured first spreading code offset is predetermined;

when it is determined the captured first spreading code offset is predetermined receiving list information indicating a second spreading code offset assigned to a second base station; and performing a second spreading code search operation, with respect to third spreading code offset other than the first and second spreading code offsets, on the basis of the received list information.

13. A mobile station apparatus, for use in a CDMA radio telecommunication system, communicating with one of a plurality of base stations, each base station broadcasting a system identification number assigned to each base station, comprising:

storing means for storing at least a system identification number;

receiving means for receiving the broadcast system identification number broadcast by a first base station;

comparing means for comparing the received system identification number with the stored system identification number;

first acquiring means for acquiring a first spreading code offset assigned to the first base station and receiving a signal transmitted by the first base station if the received system identification number is not identical with the stored system identification number;

second acquiring means for acquiring a second spreading code offset included in the received signal; and spreading code search means for performing a spreading code search operation with respect to spreading code offsets other than the first and second spreading code offsets.

14. An apparatus according to claim 13, further comprising input means for inputting information relating to a mobile communication network including the system identification number to be stored.

15. An apparatus according to claim 14, further comprising indicating means for indicating the input mobile communication network.

16. An apparatus according to claim 13, further comprising display means for displaying information indicating that the spreading code search operation is being performed while the spreading code search operation.

17. A mobile station apparatus for performing radio communication using a CDMA scheme with one of a plurality of base stations, each base station having a spreading code offset assigned thereto, said mobile station apparatus comprising:

list acquiring circuitry for acquiring list information transmitted from one of said base stations, the list information indicating a first spreading code offset assigned to at least one base station other than said one base station which transmitted the list information; and spreading code searching circuitry which uses the acquired list information to search for spreading code offsets other than the first spreading code offset.

18. A mobile station apparatus for performing radio communication using a CDMA scheme with one of a plurality of base stations, each base station having a spreading code offset assigned thereto, said mobile station apparatus comprising:

spreading code searching circuitry which is configured to search spreading codes of signals broadcast from said base stations to capture the spreading code offset assigned to a first one of said base stations;

system identification circuitry which is configured to determine whether said first one of said base stations is a base station of a desired carrier; and list acquiring circuitry for acquiring list information transmitted from said first one of said base stations if said first one of said base stations is not a base station of a desired carrier, the list information indicating the spreading code offset assigned to at least one base station which is not a base station of a desired carrier other than said first one of said base stations wherein said spreading code searching circuitry is further configured to exclude spreading code offsets indicated in the list information from the search of the spreading codes of signals broadcast from said base stations.

19. An apparatus according to claim 18, further comprising:

a memory for storing the list information transmitted from said first one of said base stations when power to said mobile station apparatus is switched off.

20. An apparatus according to claim 19, wherein, when power to said mobile station apparatus is switched on, said spreading code searching circuitry is further configured to exclude any spreading code offsets stored in said memory from the search of the spreading codes of signals broadcast from said base stations.

21. An apparatus according to claim 18, further comprising:

a communicator for communicating to a user of said mobile station apparatus that said spreading code searching circuitry is searching the spreading codes of signals broadcast from said base stations.

22. An apparatus according to claim 18, wherein said system identification circuitry comprises:

an input device for allowing a user to designate at least one of a desired radio communication network and an undesired radio communication network.

23. An apparatus according to claim 18, wherein the spreading codes are pseudorandum noise codes.

* * * * *